United States Patent [19]

Buhrer

[11] 4,197,957
[45] Apr. 15, 1980

[54] VACUUM TIGHT ASSEMBLY

[75] Inventor: Carl F. Buhrer, Framingham, Mass.

[73] Assignee: GTE Laboratories Incorporated, Waltham, Mass.

[21] Appl. No.: 973,333

[22] Filed: Dec. 26, 1978

[51] Int. Cl.² .......................... H01J 61/30; H01K 1/28
[52] U.S. Cl. ................................ 220/2.1 R; 313/311;
313/317; 428/633; 428/660
[58] Field of Search .................. 106/73.2; 220/2.1 A,
220/2.1 R; 428/632, 660, 469, 472, 633;
313/317, 318, 311, 320

[56] References Cited

U.S. PATENT DOCUMENTS

| 3,294,701 | 12/1966 | Vogel et al. ...................... 252/301.6 |
| 3,420,780 | 1/1969 | Forrat et al. ......................... 106/73.2 |
| 3,719,550 | 3/1973 | Arendt .................................. 161/188 |
| 3,785,992 | 1/1974 | Fay et al. ............................. 423/263 |
| 3,897,223 | 7/1975 | Purdy et al. .......................... 428/632 |
| 4,004,173 | 1/1977 | Rigden ............................. 220/2.1 R |

FOREIGN PATENT DOCUMENTS 1351477  5/1972  United Kingdom .

OTHER PUBLICATIONS

Hill, R. et al, "Oxidation Resistant, High Temperature Ceramic-to-Metal Seal Compatible with Cesium", Rev. Sci. Instr., vol. 38, No. 8, 8/67, pp. 1067-1068.
Berndt et al, "New A'''B'''O₃ Interlanthamide Pervoshite Compounds", L. Solid State Chem., 13, 131-135, (1975).
Geller et al., "Phase Transitions in Perovskite Compounds of the Rare Earths", Phys. Rev. B, vol. 2, No. 4, 8/70, pp. 1167-1172.
Plakhty et al, "X-Ray Study of the Phase Transition and Lattice Vibration of Lauthanum Aluminate", Izvestyu Ak. Nav. USSR, vol. 2, No. 3, 3/66, pp. 517-523.

Primary Examiner—L. Dewayne Rutledge
Assistant Examiner—Michael L. Lewis
Attorney, Agent, or Firm—William R. McClellan; Fred Fisher

[57] ABSTRACT

A vacuum-tight assembly such as a discharge tube for a metal vapor arc lamp is formed from a transparent or translucent ceramic composition sealed with a member formed from a vanadium-zirconium alloy or vanadium utilizing a brazing alloy. The vanadium or vanadium alloy and the brazing alloy have thermal coefficients of expansion closely matching that of the ceramic composition.

13 Claims, 2 Drawing Figures

VACUUM TIGHT ASSEMBLY

CROSS-REFERENCE TO RELATED APPLICATION

Applicant has filed a patent application, concurrently herewith, entitled "Ceramic Compositions and Articles Prepared Therefrom" Ser. No. 973,332 filed Dec. 26, 1978, directed to ceramic compositions of the type used in the vacuum tight assembly disclosed herein.

BACKGROUND OF THE INVENTION

This invention relates to a vacuum-tight assembly where a metal is joined to a ceramic article such as a metal vapor arc lamp discharge tube.

Ceramic compositions are used widely in high temperature environments where good chemical and mechanical stability are required. However, the great majority of ceramic compositions are opaque to visible light and therefore cannot be used in a high temperature environment where a transparent window, lamp envelope or the like are required. For example, high pressure sodium lamps are now widely used because they have a higher light-output efficiency as compared to incandescent lamps generally and they have an efficiency second only to the low pressure sodium lamp. The discharge tubes for the sodium metal vapor arc lamps are constructed from a polycrystalline alumina ceramic or from single crystal sapphire. Inside the presently utilized alumina or sapphire discharge tubes, an amalgam of sodium and mercury metals and some inert gases such as xenon are utilized to generate light. Surrounding the arc tube is an evacuated outer lamp envelope made of glass. A minimum temperature of several hundred degrees is required to vaporize the sodium and an electric arc is utilized to heat the central section of the arc tube to about 1200° C. The material forming the arc tube, in addition to being transparent or translucent, must also be stable for a considerable time period against reaction with the sodium and mercury components within the tube at its operating temperature.

While the polycrystalline alumina ceramics and single crystal sapphire have the requisite degree of transparency for use in such discharge tubes, their use was proven undesirable since they tend to dissociate and vaporize as aluminum metal from the outside of the arc tube, thereby darkening the inner surface of the glass envelope of the lamp. The rate at which this takes place determines the useful lamp life and depends both on the tube temperature and the oxygen pressure within the outer envelope. This limitation on lamp life can be overcome therefore by placing a lower limit on oxygen pressure or an upper limit on arc tube operating temperature. However, neither approach is desirable. In presently utilized arc lamps, a niobium seal is utilized to seal the sodium vapor within the arc tube. However, niobium is permeable to oxygen and any attempt to permit oxygen in the outer envelope eventually leads to sodium loss within the arc tube by oxidation to sodium aluminate. On the other hand, placing an upper limit on arc tube temperature results in an undesirable reduction of light-output efficiency.

Accordingly, it would be highly desirable to provide ceramic compositions which are transparent or translucent to visible light, and which are stable under the high temperature operating conditions of sodium vapor arc lamps. With the advent of such improved ceramic compositions, it is necessary to provide suitable sealing means for maintaining a vacuum tight discharge tube so that the fill components do not leak into the surrounding evacuated lamp envelope. Such sealing means must be chemically, mechanically and thermodynamically stable for long periods under the high temperature conditions of operation of such lamps. Accordingly, it is necessary that the sealing means be essentially unreactive with the vapor utilized in the lamp and that it have a coefficient of thermal expansion as most nearly similar to the ceramic composition as possible.

SUMMARY OF THE INVENTION

This invention is based upon the discovery that a vacuum-tight assembly for a metal arc lamp can be formed of vanadium or a vanadium alloy end-cap structure which positions a lamp electrode when utilizing a discharge tube formed from a high density polycrystalline or single crystal ceramic compositions having a perovskite structure. The end-cap structure and ceramic tube are joined with a brazing composition of titanium or zirconium alloyed with nickel, copper or iron. The vacuum assemblies of this invention are particularly useful for forming a discharge tube assembly for a sodium vapor arc lamp. That is, the assemblies of this invention can be utilized in such a lamp without the need for increasing oxygen concentration or for decreasing the temperature at which the lamp operates. Thus, by utilizing this invention, arc lamps can operate at peak efficiency for far longer periods than presently available sodium vapor arc lamps.

DESCRIPTION OF SPECIFIC EMBODIMENTS

Figure 1:
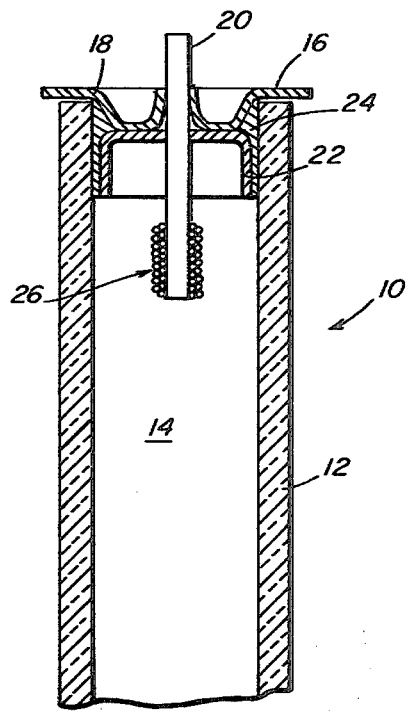
FIG. 1 is a side view of a section of the assembly of this invention.

The compositions utilized to form the discharge tube of this invention comprise sintered, densified, metallic oxides having the formula: $ABO_3$ which compositions have a perovskite structure having a side length of about 4 angstroms. The A ion is located on the cell corner while the B ion, of smaller ionic radius is located at the cell center surrounded by 6 oxide ions at the cell face centers. Suitable A ions are the rare-earth elements, lanthanum, cerium, praseodymium, neodymium or mixtures thereof. The B ions have a smaller ionic radius than the A ions, generally within the range of between about 0.5 A and about 0.9 A. Representative suitable B ions include aluminum, scandium, lutecium, or mixtures thereof. All of the compounds useful herein for forming the ceramic member are cubic perovskites or perovskites of lower symmetry some of which undergo second order phase transitions as their temperature increases so that as the temperature increases, their structure approaches that of a cubic structure.

Among the perovskite compounds falling within the above definition which are useful herein are: $LaAlO_3$, $CeAlO_3$, $LaScO_3$, $CeScO_3$, $CeLuO_3$, $LaLuO_3$, $PrAlO_3$, $NdAlO_3$, or the like. While some of the compounds falling within the scope of the above formula are known including $LaAlO_3$, $CeAlO_3$, $PrAlO_3$ and $NdAlO_3$, none of these compounds have been processed to form high density articles of manufacture which would be useful in a high temperature environment such as in an arc lamp discharge tube. Each of the aluminate compounds utilized to form the ceramic section of the present invention has a melting point approximating that of alumina, but have a lower dissociation pressure of aluminum and oxygen than does pure alumina because of the additional stability imparted by the free energy of compound formation from the component oxides. The preferred compounds utilized in the present invention are $LaAlO_3$ and $CeAlO_3$ since both the lanthanum and cerium rare earths have no appreciable optical absorption in the visible region of the spectrum where the high pressure sodium lamp emits light and because the compounds have ideal cubic symmetry above about 525° C. and 960° C. respectively which results in a lower light scattering component at the operating temperature due to crystallite birefringence relative to hexagonal alumina in polycrystalline form. Also desirable, but less preferred, compounds are the non-aluminate compounds containing instead scandium or lutecium. These compounds retain slightly non-cubic symmetry at the operating temperature of a sodium vapor lamp arc tube and therefore do not reach the degree of translucency possible with a cubic material. However, these non-aluminate compositions retain a sufficient degree of translucency which render them useful as arc discharge lamps. The non-aluminates have the advantage of eliminating the possibility of aluminum evaporation during arc lamp operation as they are aluminum free. Other modes of material degradation are unlikely in view of the higher thermodynamic stability of the component oxides in these compounds.

The compounds used to form the ceramic member of this invention are usually prepared by reaction of their component simple oxides in a non-reactive, e.g. an oxygen-containing atmosphere or, in the case of cerium compounds in an atmosphere such as hydrogen which functions to reduce tetravalent cerium in the $CeO_2$ starting compound to the trivalent state. Since the oxides generally are quite refractory by nature, temperatures of about 1300° C. are required. Material prepared in this manner is usually coarsely crystalline and unsatisfactory for sintering to high densities since the ultimate goal of this invention is to produce ceramics of near theoretical density. A most important material characteristic is the particle size of the powder being densified, and this factor greatly influences the mode of compound formation that must be used to make the powder. Not only must the powder have the particle sizes in the few tenths of a micron range, but this powder must be essentially single phase and quite free of unreacted component oxides. If it is not, then there exists the possibility of $H_2O$ or $O_2$ evolution during sintering which will inhibit the total collapse of closed pores.

In the preferred method for forming the compositions of this invention, coprecipitation of the A and B ions is effected from a salt solution of a branched chain organic acid having from six to ten carbon atoms such as the ammonium or other soluble salts of 3, 5, 5-trimethyl hexanoic acid, 2-ethyl hexanoic acid, or the like. It has been found that the precipitate obtained with such salt solutions yields a coprecipitated salt mixture that does not recrystallize readily so that the metallic elements remain intimately mixed. These precipitates can be filtered readily and dried such as in air. The conversion of the coprecipitated mixture to a mixture of metal oxides, and ultimately to the desired mixed oxide having the perovskite structure is achieved by controlled thermodecomposition and air oxidation of the precipitate to remove all organic components and free carbon. The metallic salt precipitates from the branched chain organic acids decompose without melting as they are heated thereby forming a voluminous mass containing the oxides and carbon. In contrast, salt precipitates derived from unbranched carbon chain carboxylic acids such as n-octanoic acid or lauric acid melt and decompose while partially liquid and give ash agglomerated into relatively large flake particles.

The metal oxide and carbon mixture then is heated further in air at temperatures up to about 1000° C. usually about 800° C. to allow all the carbon to oxidize leaving a white mixture or, in the case of cerium, a pale yellow mixture including $CeO_2$. The mixture can contain the compounds of this invention, the oxide of the A ion and the oxide of the B ion. Further heat treatment of this mixture, usually at about 1000° C. to about 1100° C. then completes the reaction to the oxide compound used to form the shaped articles of this invention. As noted above, in the case of cerium compounds, this heating step is carried out in the presence of a reducing agent such as hydrogen which permits the simultaneous reduction and reaction to take place thereby forming the desired compound. Compounds prepared in this manner usually have a particle size within the 0.1 to 0.2 micron range. This powdered product then can be treated such as by ball milling, air jet milling or the like to further reduce the average particle size thereof. Since the above-described coprecipitation procedure produces a product having a smaller average particle size than by other procedures for producing a product which is to be sintered, this coprecipitation procedure is preferred.

An alternative process for forming the oxide powdered mixtures involves the direct reaction of an oxide of an A ion and an oxide of the B ion in proper stoichiometric concentrations at a temperature generally in the range of about 1000° C. to 1500° C., usually between about 1300° C. and 1400° C. in a non-reactive, e.g. oxygen-containing atmosphere. The product obtained is relatively coarsely crystalline and requires generally extensive comminution such as by ball milling and/or air jet milling.

The fine particles having an average particle size of less than about 0.2 micron comprise fully reacted perovskite compounds and serve as the starting material for the sintering step utilized to form translucent ceramics of near theoretical density. The particles are densified either in the presence of a small quantity of alumina in addition to that needed for stoichiometry as a densification aid or in the absence of a densification aid. When employed, the alumina utilized as a densification aid can be added before or after the initial coprecipitation step. It is preferred that it be added prior to the coprecipitation step in order to form a powder wherein the additional alumina is homogeneously dispersed. By way of example, in the case of lanthanum aluminate and cerium aluminate, the compositions to be sintered including the alumina as a densification aid have the formulae: $LaAl_{(1+X)}O_{3(1+X/2)}$ or $CeAl_{(1+X)}O_{3(1+X/2)}$ where X is between 0 and 0.03. During the sintering process the excess alumina allows the formation of a second crystallographic phase of composition $LaAl_{11}O_{18}$ or $CeAl_{11}O_{18}$. This may be seen by formulation the original composition as:

$$(1 - \frac{X}{10})(LaAlO_3) \cdot (\frac{X}{10})(LaAl_{11}O_{18}) \text{ or}$$

-continued $$(1 - \frac{X}{10})(CeAlO_3) \cdot (\frac{X}{10})(CeAl_{11}O_{18}).$$

The aluminate powder with the aluminum composition so modified with X values of up to 0.03 is obtained from the processing step in which the reaction of the component oxides is completed by heating in air in the case of $LaAlO_3$ or hydrogen in the case of $CeAlO_3$. The powder then is subjected to a deagglomeration processing step such as by being milled in an air jet stream.

The first step in forming the translucent ceramic from the powder is to compress the fine powder in a mold of desired shape. Typically, to improve the green strength of the pressed piece, a 1% water solution of polyvinylalcohol (PVA) can be added to the powder which is then dried and sieved through a fine mesh. Complex shapes such as an arc tube needed for high pressure sodium lamp construction can be isostatically pressed in suitable mold such as a rubber bag mold having a stainless steel core insert that forms the inner hold of the tube. Pressures of approximately 30,000 pounds per square inch are satisfactory. The so-called green densities at this stage are in the range of 45% to 58% of the theoretical density of the solid (6.522 $gm/cm^3$ for $LaAlO_3$, 6.644 $gm/cm^3$ for $CeAlO_3$). After pressing, the piece is prefired at a temperature of about 1200° C. to remove any residual moisture and PVA, if present. $LaAlO_3$ is processed usually in air, while $CeAlO_3$ is processed in hydrogen to avoid oxidative decomposition of the material.

The sinterings of the prefired pieces are conducted in conventional apparatus such as in a hydrogen atmosphere furnace wherein tungsten heating elements and molybdenum heat shields operated in hydrogen are used to achieve temperatures in the order of 2000° C. A two cycle sintering process gives excellent results in achieving theoretical density. It is believed that the improvement is based upon the behavior of the perovskite compounds in the presence of the slight excess of alumina in their formulation. However, it is to be understood that applicant does not intend to be limited to this theoretical explanation. As shown above, the excess alumina corresponds to a small mole fraction of a second phase $LaAl_{11}O_{18}$ or $CeAl_{11}O_{18}$. These compounds with the corresponding perovskite compounds $LaAlO_3$ and $CeAlO_3$ form a liquid of eutectic composition at a temperature considerably lower than the melting point of the pure perovskite primary phase. For example, in the case of $CeAlO_3$ this eutectic liquid appears at approximately 1775° C. The first sintering cycle is carried out below this temperature where the second minor phase exists as minute solid particles that appear as the powder begins to recrystallize. They retard the grain growth of the $CeAlO_3$ primary phase by pinning the grain boundaries between crystallites. As this first sintering cycle proceeds at temperatures below the eutectic melt temperature, the pore volume decreases while grain growth is retarded. This retardation is desirable to avoid entrapment of pores within crystallite grains because, once so-trapped grains can no longer be expelled from the ceramic structure. A satisfactory temperature cycle for this sintering phase in $CeAlO_3$ is about 1600° C. to 1650° C. for about four to five hours in the hydrogen atmosphere.

The second sintering cycle is carried out above the eutectic temperature where the $CeAl_{11}O_{18}$ solid phase vanishes and a liquid of eutectic composition is present. This liquid appears between grains of $CeAlO_3$ and serves as a recrystallization medium that allows the grain boundary to move in such a direction which tends to increase the average crystallite size. As it moves it serves to collect most of the residiual pores left after the first sintering cycle. A satisfactory temperature cycle for this sintering phase in $CeAlO_3$ at 1850° C. for about one to five hours.

The ceramic member of the present invention has a density of at least about 95% theoretical density and preferably more than about 99% theoretical density. The products obtained are transparent or sufficiently translucent to visible light as to permit their use as metal vapor arc discharge tubes.

As noted above, the ceramic sections comprise a component for a vacuum assembly which can be utilized as a light source such as a sodium vapor lamp. The ceramic component includes a cavity in which a chemical fill such as a mixture of xenon, mercury and sodium vapors can be contained, which is vacuum tight such that these discharge components do not escape into the nominally evacuated region surrounding the ceramic section, and into which electrodes extend which produce an electrical discharge during use. In order to permit satisfactory use of the assembly over a long period, the cavity must be tightly sealed to avoid loss of the discharge components into the outer envelope. In addition, the manner of sealing must permit an electrode to extend into the cavity and to be connected to an electrical source of electrical energy. In accordance with this invention, it has been found that the desired sealing and electrode positioning can be obtained by utilizing pieces of vanadium or vanadium-zirconium alloy containing up to about 4 weight percent zirconium which cover the opening(s) to the cavity and which are bonded to the ceramic piece at the opening(s). The vanadium or vanadium-zirconium alloy pieces are bonded to the ceramic with a brazing alloy.

The brazing alloy contains an active metal which wets both the ceramic composition as well as the metal end piece. In addition, the brazing alloy should not be so reactive as to degrade the metal end pieces or the ceramic composition. Furthermore, the brazing alloy should have a coefficient of thermal expansion as nearly as possible equal to that of the ceramic composition. Also, the brazing alloy and metal end pieces should be essentially unreactive with materials within the cavity such as sodium vapor in the case of a sodium vapor lamp. In accordance with this invention, it has been found that brazing compositions based upon zirconium or titanium alloyed with copper, nickel, iron or mixtures thereof are eminently suitable in the present invention. When utilizing titanium, the total weight percent of nickel, copper and/or iron should be between about 10 and 35, preferably between about 15 and 30. When utilizing zirconium, the total weight percent of nickel, copper and/or iron should be between about 10 and 30, preferably between about 15 and 25. The preferred alloys are 79–83 weight percent zirconium wherein the remainder of the alloy is nickel or nickel and copper. As noted above, the thermal coefficients of expansion of the brazing alloy must closely match that of the ceramic composition over a wide range of temperatures. That is, the thermal coefficient of expansion of the brazing alloy should differ by no more than about 10% from the thermal coefficient of expansion of the ceramic composition. In a lamp construction, the discharge tube is surrounded by a transparent envelope such as can be formed easily with glass composition.

Referring to FIG. 1, a sectional view of a typical sodium vapor discharge assembly 10 is shown. Not shown is the outer jacket and lamp base. The discharge assembly 10 includes a cylindrical ceramic tube 12 made from the composition described above which defines the cavity 14. Each end of the tube is sealed with the sealing means described above. A typical sealing arrangement is shown in FIG. 1 and comprises strips 16 and 18 comprising vanadium or a vanadium-zirconium alloy and shaped to support by means of spot welded joints an electrode support rod 20 typically formed of tungsten. A metal cup 22 is positioned to form the end closures of the cavity 14. The metal cup 22 is made from the same metal composition as the strips 16 and 18 and it has a central hole through which electrode support rod 20 is tightly fit. The strips 16 and 18 and cup 22 are initially spot welded together and to the support rod 20 and then are sealed to the ceramic tube 12 by brazing alloy 24. The end of the electrode support rod 20 within the cavity 14 is wound with a double layer of wire 26 typically formed from tungsten coated with a barium-calcium tungstate mixture.

Figure 2:
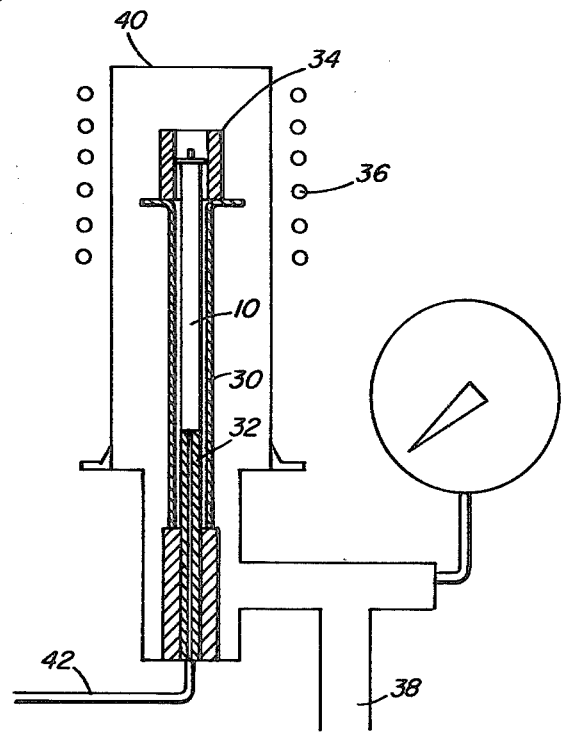
FIG. 2 illustrates a process for forming the assembly of this invention.

A method for forming a discharge tube for a sodium vapor lamp will be described with reference to FIGS. 1 and 2. The vanadium strips 16 and 18 and cup 22 are spot welded together and to the tungsten electrode support rod 20. The electrode 26, a coiled tungsten wire, impregnated with alkaline earth tungstates, is pressed onto the support 20 and the sealing assembly is placed into the cavity 14 of a ceramic tube 12 as shown. After chips of brazing alloy 24 are placed on top of cup 22, discharge assembly 10 is put into quartz fixture 30 and placed on support 32 which is then evacuated and outgassed by heating the graphite suscepter 34 to several hundred degrees by induction coil 36. A diffusion pump (not shown) is connected to conduit 38 to evacuate the atmosphere within quartz bell jar 40 and, after the desired vacuum is drawn, it is shut off and argon is allowed to flow in through inlet 42 so that the pressure rises to 15 torr in about 30 seconds. Then a valve to a mechanical pump is opened just enough to keep the pressure balanced at 15 torr. With such a low pressure flow of argon up and around the seal area, the temperature is increased until the braze melts and flows around the seal circumference, held for a few seconds and allowed to cool.

The following examples illustrate the present invention and are not intended to limit the same.

EXAMPLE I

This example illustrates the preparation of the representative starting materials, lanthanum aluminate and cerium aluminate used to form the products of this invention. In this procedure, a nitrate solution of the mixed cations of either lanthanum and aluminum or cerium and aluminum is coprecipitated as the 2-ethyl-hexanoate salts and dried. The dry solid is burned in air to the oxide mixture of either $CeO_2 + Al_2O_3$ or $La_2O_3 + Al_2O_3$. Reaction in air in the case of lanthanum or reductive reaction in hydrogen in the case of cerium is then used to effect the conversion of $LaAlO_3$ or $CeAlO_3$.

A convenient quantity of material for testing is that containing 1/6 mole of $CeAlO_3$ or $LaAlO_3$. Allowing for losses in handling, about 30 g of powder can be obtained. Solutions of the rare earth nitrate are prepared from lanthanum oxide or cerous carbonate by dissolution in dilute nitric acid. Aluminum nitrate solution is prepared from the solid and water. Both solutions are filtered and assayed for their rare earth oxide content. Appropriate quantities of solution corresponding to the desired amount of the composition to be formulated are measured and combined. The resultant mixture is stirred for several minutes to ensure thorough mixing. As much as possible of any excess nitric acid then is neutralized by adding ammonium hydroxide and stirring until any transient precipitate redissolves. The solution then is diluted to a concentration of $\frac{2}{3}$ moles per liter.

The precipitation of the 2-ethyl hexanoate salts of Ce and Al or La and Al requires about three moles of acid for each mole of Ce and only about two moles of acid for each mole of Al since the salts of these organic acids are hydroxy salts. To allow for some excess precipitant, between about 5/6 and 1 mole of 2-ethyl hexanoic acid as the ammonium salt is used for the precipitation of 1/6 mole of $CeAlO_3$ or $LaAlO_3$.

The 2-ethyl hexanoic acid is filtered or preferably distilled before use to remove impurities. To about 1 to 1.2 liters of deionized water are added 132 g of this acid and enough ammonium hydroxide reagent to dissolve the oily acid and bring the pH to 9 (60 ml to 75 ml). To this cloudy solution then is added slowly with stirring 250 ml of the mixed metal nitrate solution containing 1/6 mole $CeAlO_3$ or $LaAlO_3$. During the precipitation the pH should be kept at about 9 by the addition of dilute ammonia. After the last of the nitrate is added, the precipitate is filtered and washed once with an equal volume of water containing enough $NH_3$ to make the pH equal to 9. The white precipitate is oven-dried for two days at 80° C.

The pH control during the precipitation appears to be important. At higher pH, a significant amount of the Ce or La precipitates as the hydroxides as evidenced in the case of Ce by the susceptibility of the precipitate to air oxidation to a brown color. At lower pH and particularly if the nitrate solution is very acidic, the initial precipitate contains free 2-ethyl hexanoic acid and the metal added later has insufficient precipitant. The oxides formed from such products do not as readily react to give $CeAlO_3$ or $LaAlO_3$.

The decomposition of the organic salt precipitate to the oxides is done in a quartz boat in a horizontal tube furnace. An air flow enters one end of the furnace tube, and the other end is left wide open to avoid explosions. The salt at the inlet end is ignited with a flame and continues to burn or smolder as the boat is pushed into the furnace tube from the open end. The air flow aids the combustion which proceeds along the boat in a few hours. When the entire contents appear charred and incapable of sustaining further combustion without additional heat, the furnace is turned on and raised to about 700° to 800° C. After one to two hours the powder ash is free of black carbon.

The mixture of oxides is then further heated to 1000° C. to 1100° C. in a stream of air in the case of $LaAlO_3$ or hydrogen in the case of $CeAlO_3$ preparation. After about three hours the product is converted to the perovskite phase product essentially free of the individual component oxides. In this procedure it appears preferably to leave the oxide undisturbed before reaction so that the porous structure of the material can aid in minimizing agglomeration of the powder during the further heating. Then the product is hand-ground and sieved through 50 mesh cloth after which it can be air jet milled and stored for sintering experiments.

EXAMPLE II

This examples illustrates the preparation of densified sintered products with the CeAlO$_3$ compositions of Example I when admixed with a densification additive comprising CeAl$_{11}$O$_{18}$.

Powders of various compositions, but all based on CeAlO$_3$, were mixed after jet milling with a 1% water solution of polyvinyl alcohol (PVA) to form a slurry which was then dried and sieved through a fine nylon mesh. Disk samples were pressed in a ½-in. diameter die to a thickness of about 1/16 in. A low pressure of about 5000 lb/in.$^2$ was used. Each was then wrapped in plastic film, put in a rubber bag and isostatically pressed at about 30,000 lb/in.$^2$. The so-called green densities at this stage varied from 45% to 58% of theoretical (6.644 gm/cm$^3$ for CeAlO$_3$). A prefiring in H$_2$ to 1000° to 1200° C. was done to remove the organic binder. Sinterings were carried out in a Centorr furnace in which tungsten elements and molybdenum heat shields operated in hydrogen are used to achieve temperatures of 2000° C. and higher.

The sintering studies were made on CeAlO$_3$. Sintering runs were made on the pure compound, that is, a preparation in which the Ce to Al atomic ratio is as close to unity as can be achieved by accurate assaying of the stock solutions and on CeAlO$_3$ with various additions. The technique of air jet milling was introduced which greatly aided the densification process by reducing the powder particle size.

The principal system under investigation was:

$$\frac{CeAl_{(1+X)}O_3}{\left(1+\frac{X}{2}\right)} \quad (or)$$

$$\left(1-\frac{X}{10}\right) CeAlO_3 \cdot \frac{X}{10} CeAl_{11}O_{18}$$

with X=0.01, 0.03.

As applied to the compositions, a first cycle was done at 1600° and 1650° C. for four and five hours, respectively, and a second cycle was at 1850° C. for five hours. Samples with X equal 0, 0.01 and 0.03 reached 96.4%, 97.4% and 99.4% of theoretical density, respectively.

EXAMPLE III

Specimens of LaAlO$_3$ and CeAlO$_3$, prepared as described above, were tested to determine their thermal expansion characteristic. Bar-shaped specimens close to 1 inch long and about ⅛ inch square were used in a Theta Industries dilatometer with an alumina sample holder. A platinum bar of the same 1 inch length was used to calibrate the instrument. Expansion vs. temperature was recorded by increasing temperature in steps and allowing the system to equilibrate in a low flow rate of argon inside the instrument. The expansions measuring approximately 107°×10$^{-7}$° C. in the 25° to 1000° C. range are larger than that of the alumina presently used in high pressure sodium lamp technology. Thus, the niobium metal used for metallic conduction to the electrodes in alumina arc tubes and chosen for its thermal expansion match with alumina would be unsatisfactory with these aluminates but vanadium which has a known expansion which substantially matches that measured for LaAlO$_3$ and Ce AlO$_3$ is ideally suited for use with these aluminates.

A study of various brazing alloys was undertaken to find one that wets and seals well to the ceramic and vanadium and which matches the expansion of both. Alloys of an active metal, such as Ti or Zr and either Ni, Cu or Fe, were studied. Low melting compositions on the Ti or Zr rich side of the phase diagrams were chosen to avoid catastrophic dissolution of the vanadium. Each alloy was formulated from its component elements in a 10 g lot and arc melted in an argon atmosphere. Each ingot was melted and stirred with the arc, flipped over on a cool copper hearth and remelted several times. They were finally solidified in an oblong depression such that a 1 inch long test specimen could be cut for expansion measurements.

Thermal dilation vs. temperature was measured for each using Pt as a standard. Each sample was run in the same way using a low flow of argon to protect the alloy. The metal bars oxidized slightly on their surface in spite of the protective atmosphere because the flow was necessarily low to minimize temperature gradients. The temperature range over which the data is valid was limited by this oxidation. Average expansion coefficients over the range 25° C. to 800° C. are given in the table below.

The compositions studied were:

| SAMPLE | CONSTITUENTS OF THE ALLOY, w/o | | | | | AVERAGE EXPANSION COEFFICIENT 25°-800° C. |
|---|---|---|---|---|---|---|
| | Ti | Ni | Cu | Fe | Zr | |
| A | 71.5 | 28.5 | | | | 124 × 10$^{-7}$/° C. |
| B | 68 | | | | 32 | 133 × 10$^{-7}$/° C. |
| C | | 17 | | | 83 | 108 × 10$^{-7}$/° C. |
| D | | | 21 | | 79 | 93.5 × 10$^{-7}$/° C. |
| E | | 10 | 10 | | 80 | 100 × 10$^{-7}$/° C. |

Plotted thermal expansion curves for each of the samples, A through E, showed that alloys, C, D and E were satisfactory in that they deviated from the expansion curves for the ceramics by less than about 10%. In contrast, alloys A and B showed thermal expansion curves that deviated from that of the ceramics by more than about 10% and thus, appear to be unsatisfactory for use herein.

In an early seal design, the braze was made at the lower end of a ceramic tube while it stood within a larger diameter cup, and the seal assembly also included a vanadium tubulation for subsequent evacuation and fitting of the arc tube. This tubulation was utilized because while the seal is being made at the lower end, it is not possible to contain the sodium amalgam pellet within the tube. Because the brazing alloy was placed inside the tube during the brazing operation, there was some volatilization of the braze components, in particular copper, onto the inner wall of the arc tube. A lamp constructed in this way using a leak tight although not completely translucent tube of CeAlO$_3$ showed a green discharge coloration due to copper until the copper moved to the cooler ends of the arc tube and the discharge became yellow. The lamp was turned off when it showed signs of sodium loss through the pinched off and welded tubulations.

The experiences with this lamp led to a second and preferred seal design that would eliminate tubulations and minimize the exposure of the inner walls of the tube to the brazing alloy. The tubulations were eliminated by utilizing a sealing technique that could be done at the top of an arc tube, while it was held in a vertical position as shown in FIG. 2. Hence, before the second end cap seal is made, the sodium amalgam pellet can be put in the arc tube and the seal made in an inert atmosphere corresponding to the lamp buffer gas. When the second end cap seal is made, the arc tube is completed.

The seal for the aluminate tubes uses a short cylindrical vanadium metal cup with an outer diameter slightly smaller than the inside diameter of the ceramic arc tube and supported just inside the end of the tube by two vanadium metal strips that are welded to the cap and rest on the tube edge. In addition, a tungsten rod is welded in place through a hole in the center of the cup. Brazing alloy chips made of 80 wt.% Zr, 10 wt.% Ni, and 10 wt.% Cu (75 mg to 100 mg) are placed on the end of the cup at the top portion of the tube and heated in argon by radiation from a hollow graphite susceptor. The braze melts and wets the inner wall of the ceramic sealing it to the outer sides of the cup. It also seals the tungsten rod in place. All the seals made this way were leak-tight. No special ceramic inserts are needed, and the vanadium cup is easily fabricated by pressing from argon-annealed pure vanadium sheets 0.010 inch thick.

What I now claim is:

1. A vacuum-tight assembly comprising a high density polycrystalline ceramic body having a cavity and means for sealing said cavity from the atmosphere, said ceramic body being substantially transparent to visible light, and consisting essentially of a compound having a perovskite structure having the formula: $ABO_3$, wherein A is selected from the group consisting of lanthanum, cerium, praseodymium, neodymium and mixtures thereof and B is selected from the group consisting of aluminum, scandium, lutecium, and mixtures thereof, said means for sealing comprising at least one closure member formed from vanadium or a vanadium alloy containing up to about 4 weight percent zirconium and a brazing alloy, said closure member and brazing alloy having thermal coefficients of expansion closely matched to the thermal coefficient of expansion of said ceramic body over a wide temperature range.

2. The assembly of claim 1 wherein B is aluminum.

3. The assembly of claim 1 wherein A is lanthanum.

4. The assembly of claim 2 wherein A is lanthanum.

5. The assembly of claim 1 wherein A is cerium.

6. The assembly of claim 2 wherein A is cerium.

7. The assembly of claim 1 which is enclosed by a transparent envelope.

8. The assembly of claim 7 wherein said envelope is formed from a glass composition.

9. The assembly of claim 1 wherein the sealing member comprises a vanadium-zirconium alloy containing up to about 4 weight percent zirconium.

10. The assembly of claim 1 wherein the brazing alloy comprises zirconium or titanium containing between about 10 and 35 weight percent of a metal selected from the group consisting of nickel, copper, iron and mixtures thereof.

11. The assembly of claim 10 wherein the brazing alloy comprises zirconium containing between about 15 and 25 weight percent of a metal selected from the group consisting of nickel and copper and mixtures thereof.

12. The assembly of claim 4 wherein the brazing alloy comprises zirconium containing between about 15 and 25 weight percent of a metal selected from the group consisting of nickel and copper and mixtures thereof.

13. The assembly of claim 6 wherein the brazing alloy comprises zirconium containing between about 15 and 25 weight percent of a metal selected from the group consisting of nickel and copper and mixtures thereof.

* * * * *